United States Patent
Plettner et al.

(10) Patent No.: US 7,053,854 B2
(45) Date of Patent: May 30, 2006

(54) DEVICE FOR SHIELDING A TRANSPONDER, METHOD FOR PRODUCING A CORRESPONDING SHIELDING AND TRANSPONDER PROVIDED WITH SAID SHIELDING

(75) Inventors: Andreas Plettner, Feldafing (DE); Arno Stein, München (DE)

(73) Assignee: Flexchip AG, Munich (DE)

( * ) Notice: Subject to any disclaimer, the term of this patent is extended or adjusted under 35 U.S.C. 154(b) by 0 days.

(21) Appl. No.: 10/491,744

(22) PCT Filed: Oct. 7, 2002

(86) PCT No.: PCT/EP02/11217

§ 371 (c)(1), (2), (4) Date: Jan. 3, 2005

(87) PCT Pub. No.: WO03/032246

PCT Pub. Date: Apr. 17, 2003

(65) Prior Publication Data

US 2005/0104796 A1    May 19, 2005

(30) Foreign Application Priority Data

Oct. 5, 2001    (DE) ................ 101 49 126

(51) Int. Cl.
*H01Q 1/52* (2006.01)
(52) U.S. Cl. .............. 343/841; 343/788; 340/572.5
(58) Field of Classification Search ........... 343/787, 343/788, 841
See application file for complete search history.

(56) References Cited

U.S. PATENT DOCUMENTS

| | | | |
|---|---|---|---|
| 4,486,731 A | | 12/1984 | Westcott |
| 5,557,279 A | * | 9/1996 | D'Hont ............... 342/42 |
| 5,864,323 A | * | 1/1999 | Berthon ............... 343/788 |
| 6,018,298 A | * | 1/2000 | Endo et al. ............ 340/572.5 |
| 6,812,707 B1 | * | 11/2004 | Yonezawa et al. ....... 324/326 |
| 6,927,738 B1 | * | 8/2005 | Senba et al. .......... 343/787 |

FOREIGN PATENT DOCUMENTS

| | | |
|---|---|---|
| DE | 198 46 237 A1 | 4/2000 |
| DE | 198 48 821 C1 | 5/2000 |
| DE | 198 48 833 C1 | 9/2000 |
| EP | 0 768 620 A2 | 4/1997 |
| EP | 0 782 214 A1 | 7/1997 |
| GB | 1 331 604 | 9/1973 |
| WO | WO 89/07347 | 8/1989 |

* cited by examiner

*Primary Examiner*—Tho Phan
(74) *Attorney, Agent, or Firm*—Workman Nydegger

(57) ABSTRACT

A unit for shielding a transponder includes at least a chip and an antenna structure with application-specific spatial dimensions and which is secured to an electrically conductive surface. The unit includes a film having formed thereon or therein a highly permeable material at least in an area having the spatial dimensions of the antenna structure of the transponder. The highly permeable material is subdivided into elongate shielding elements and free spaces arranged between the respective shielding elements such that when the substrate has been attached to the transponder, the shielding elements will be oriented parallel to a magnetic field induced in the antenna structure of the transponder, so as to suppress eddy currents which are generated by the electrically conductive surface in the antenna structure, when the transponder is being introduced in a magnetic field of a respective reading device.

30 Claims, 2 Drawing Sheets

US 7,053,854 B2

DEVICE FOR SHIELDING A TRANSPONDER, METHOD FOR PRODUCING A CORRESPONDING SHIELDING AND TRANSPONDER PROVIDED WITH SAID SHIELDING

CROSS-REFERENCE TO RELATED APPLICATIONS

This application is a 371 of PCT/EP02/11217, filed on Oct. 7, 2002.

BACKGROUND OF THE INVENTION

1. Field of the Invention

The present invention relates to a shielding for a transponder comprising at least a chip and an antenna structure.

2. Description of the Related Art

In many spheres of public life, RFID systems for identifying arbitrary objects have increasingly been used within the last few years. The term RFID stands for Radio-Frequency-Identification and designates an identification by means of radio waves. An RFID system always comprises two components: an evaluation device that can be implemented as a read and/or write unit, and a transponder carrying the data used for identification.

Transponders which are nowadays produced comprise a small-area chip and an antenna structure. The most common use of transponders are contactless chip cards, which are nowadays predominantly used as means of payment in the form of cheque cards, or as access examination means in the form of access tickets or corporate identification cards, the identification data in question being stored in a storage means of the chip. Contactless chip cards allow simple handling, they are robust and their susceptibility to interference is therefore low, and they offer a plurality of interesting possibilities of use.

Progress in the field of silicon technology allows extremely low-energy, passive transponders. It is, in particular, possible to realize transponders which are fed with energy from a high-frequency field (HF field) and which store data by means of this energy and re-transmit these data by means of a damping modulation. When data are transmitted in this way, the transmission bandwidth is limited to a fraction of a carrier frequency for fundamental electro-technological reasons, the data rates realized at present being approx. 58 kbits. Further developments in the field of chip technology will presumably lead to chips which are capable of storing a data amount of approx. 1. Mbit on a chip area of approx. 1 mm². Reading of such an amount of data will take about 18 seconds with the bit rates realized today.

In order to increase these data rates, it will be necessary to use higher carrier frequencies; this will be possible due to further developments in the field of chip technology, especially in the field of CMOS technology, since circuits having a clock rate of 1 GHz and more can be realized, not least in view of the continuous reduction in size of the structures in question.

The antenna structure of commonly used transponders is implemented either as a conductor loop or as a dipole. The implementation as a conductor loop allows inductive incoupling of the signal and offers the advantageous possibility of resonant operation. In order to achieve this, the conductor loop is connected to a capacitance so as to form an oscillating circuit, which is tuned to the operating frequency of the contactless chip card and which defines together with a coil of the evaluation device a loosely coupled transformer.

Such inductive transponders are capable of exchanging data with an evaluation device over a distance of a few centimetres to a few meters. Transponders used for this purpose are usually operated in a frequency region of a few MHz, normally at the allowed frequency of 13.56 MHz. In view of the fact that the energy required for operating the chip is received from the evaluation device via the conductor loop in a contact-free manner so that the transponder need not be provided with a voltage source of its own and will behave absolutely passive especially outside of the operating range of the evaluation device, the necessary number of windings of the conductor loop will be too high in the case of lower frequencies and the inductances will be too low in the case of higher frequencies for realizing a conductor loop of sufficient quality.

In cases in which the antenna structure is implemented as a dipole, the transponder can be used in a so-called "close-coupling system" as well as in a "long-range system".

Close-coupling systems are RFID systems with a very short range in which the dipole of the transponder allows a purely capacitive incoupling of signals from an evaluation device, which is located at a small distance of approx. 0.1 cm to 1 cm from the transponder and which is also provided with suitable electrode surfaces. For coupling in the signal, the two dipoles are placed parallel to one another and define thus plate capacitors via which data and/or energy is/are transmitted.

In the case of long-range systems, ranges of 1 m to 10 m distance between the transponder and the evaluation device can be achieved. In long-range systems the dipole is implemented as a dipole antenna and it is operated at very high frequencies, said frequencies being approx. 2.45 GHz and 5.8 GHz in Europe at present. An evaluation device emits power which is present at the terminals of the dipole antenna of the transponder as a HF voltage and which, after having been rectified, is used for feeding the chip.

The production of extremely thin chips, which are connected to conductor loops or dipoles that are thin as well, allows the formation of extremely thin transponders, so-called Smart or RFID labels. In the case of many applications of RFID labels it will make sense to operate these labels on metal surfaces. A typical field of application is the universal identification of goods in a shopping basket in a supermarket. In spite of the logistic advantages, the universal identification will only make sense and will only be justified if all goods are labeled in this way as far as possible, i.e., also metallic objects such as tins and primarily also packets containing a metallized foil.

The mounting of a transponder, including, e.g., a high-frequency conductor loop, directly on a metallic surface is, however, not easily possible. The alternating magnetic flux through the metal surface induces eddy currents in the conductor loop which counteract the cause, i.e., the field of the conductor loop, and which therefore damp the magnetic field on the surface to such an extent that a supply of energy to and data transmission from the chip of the transponder are no longer possible.

By inserting highly permeable materials, such as ferrites, between the conductor loop and the metal surface, the formation of eddy currents can be reduced and largely avoided. A magnetically highly permeable layer between the conductor loop and the metal support will conduct the flux lines closer to the conductor loop according to its magnetic conductivity; less flux lines will penetrate into the underlying metal and, consequently, less eddy currents will be induced. This will, however, have the effect that the inductance of the conductor loop changes and that the oscillating circuit will be detuned so that the resonant frequency will become lower. Fundamentally, the self-inductance will be increased by ferromagnetic materials and decreased by non-ferromagnetic materials. The resonant frequency will change in both cases.

Shielding against high-frequency fields is a general problem that arises in the field of technology; in the case of RFID technology, this problem has, however, a special aspect: in RFID systems, the position of the electric or magnetic field which is to be shielded against or to be conducted more precisely is known because it is defined by the geometry of the antenna structure arranged in close vicinity to the metallic support.

For producing the shielding effect, ferrite films are normally used at present. These films contain ferrite particles having dimensions in the μm range, which are embedded in polymers and therefore electrically insulated from one another. In spite of the high permeability of the individual particles, an only low overall permeability of typically approx. 10 will be obtained due to the large number of "air gaps" between the particles. A permeability of 10 means that the path length of the magnetic flux lines will effectively be reduced by a factor of approx. 3; the geometric distance between the RFID label and the metal support can be reduced by this factor, with the effect remaining the same in all other respects.

Higher values can be obtained by compact magnetic conductors, e.g., layers or compact films of highly permeable metals. For suppressing the above-mentioned eddy currents, these magnetic conductors must be structured such that they suppress a flow of current in the direction of the induced electric field. Such eddy currents extract energy from the field, and this will lead, on the one hand, in a reduction of the amount of useful energy that can be transmitted and, on the other hand, in a damping of the antenna circuit with disadvantageous effects on data transmission. A similar phenomenon is known from the field of electrical engineering, e.g., when mutually insulated blade fins are provided on transformers.

SUMMARY OF THE INVENTION

Proceeding from the known prior art, it is the object of the present invention to provide a possibility of operating an RFID system in metal surroundings as trouble-free as possible.

This object is achieved by the subject matters of the independent claims. Preferred embodiments of the present invention are subject matters of the subclaims.

The object of the present invention is especially achieved by a unit for shielding a transponder, which comprises at least a chip and an antenna structure with application-specific spatial dimensions and which is attached to an electrically conductive surface.

According to one aspect of the present invention, this unit comprises a film having formed thereon or therein a highly permeable material at least in an area having the spatial dimensions of the antenna structure of the transponder. The highly permeable material is subdivided into elongate shielding elements and free spaces arranged between the respective shielding elements, in such a way that, when the substrate has been secured to the transponder, the shielding elements will be oriented parallel to a magnetic field induced in the antenna structure of the transponder, so as to suppress eddy currents which are generated by the electrically conductive surface in the antenna structure, when the transponder is being introduced in a magnetic field of a respective reading device.

According to another aspect of the present invention, said unit comprises a substrate having formed thereon a plurality of fixed ferromagnetic particles in an area having at least the spatial dimensions of the antenna structure of the transponder. The respective ferromagnetic particles are oriented such that, when the substrate has been attached to the transponder, they will be oriented parallel to a magnetic field induced in the antenna structure of the transponder, so as to suppress eddy currents which are generated by the electrically conductive surface in the antenna structure, when the transponder is being introduced in a magnetic field of a respective reading device.

One advantage of the unit according to the present invention is to be seen in the fact that the film or the substrate, which is implemented as a shielding layer, can be comparatively thin. It follows that the shielding layer will be moderate in price and it can be implemented such that it can safely be disposed of, i.e., recycled and dumped. Another advantage is that processing is simple: a shielding layer which is thin and which is produced, e.g., in the form of a film can be treated by means of paper converting processes. Hence, easy processing into Smart labels is possible.

The substrate according to the present invention is preferably provided with ferromagnetic particles on the front and on the back, and it is made of an electrically non-conductive material, i.e., an organic polymer. In addition, the substrate can be made of paper.

In particular, the substrate can represent a transponder or an inlay for a transponder.

The antenna structure represents preferably an antenna coil or a closed or an open dipole, e.g., a slot antenna.

The ferromagnetic particles are made, e.g., of iron and belong preferably to the garnet group of substances (yttrium-aluminum compounds).

In addition, the object according to the present invention is achieved by a method of producing a shielding for a transponder, which comprises at least a chip and an antenna structure with application-specific spatial dimensions, the shielding being formed on a substrate. Said method comprises the following steps: applying ferromagnetic particles to an area of the substrate having at least the spatial dimensions of the antenna structure of the transponder; orienting the ferromagnetic particles by means of a constant magnetic field in such a way that, when the substrate has been secured to the transponder, the particles will be oriented parallel to a magnetic field induced in the antenna structure of the transponder; and fixing the oriented particles.

The step of orienting the ferromagnetic particles is executed, e.g., by means of one or a plurality of permanent magnets, or by means of one or a plurality of electrically excited magnets with a constant magnetic field.

The step of fixing the oriented particles can be executed by means of an adhesive, the ferromagnetic particles being preferably applied together with the adhesive and the fixing taking place during or immediately after the orienting of the ferromagnetic particles.

In addition, the ferromagnetic particles can be contained in a lacquer which is applied to the substrate. In this case, the oriented particles are preferably fixed by thermal drying and hardening of the lacquer.

The ferromagnetic particles are made of, e.g., soft-magnetic iron or of a ferroelectric material producing a similar effect or of an alloy or mixture producing an effect of the type in question.

The respective ferromagnetic particles preferably have longitudinal dimensions which are comparable with the width of the induced magnetic field, e.g., 1/20 to 1/5 of the width of the induced magnetic field.

The ferromagnetic particles are preferably highly permeable and elongate in shape and they each have a length of approx. 300 µm, a width of approx. 50 µm and a thickness of approx. 10 µm.

The substrate according to the present invention can be applied to the transponder after the fixing of the ferromagnetic particles. Furthermore, the transponder can be formed prior to producing the shielding on the substrate.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following, and more particular description of the invention as illustrated in the accompanying drawings, showing.

DETAILED DESCRIPTION OF THE PREFERRED EMBODIMENTS

The illustrative embodiments of the present invention will be described with reference to the figure drawings, wherein like elements and structures are indicated with like reference numbers.

Figure 1:
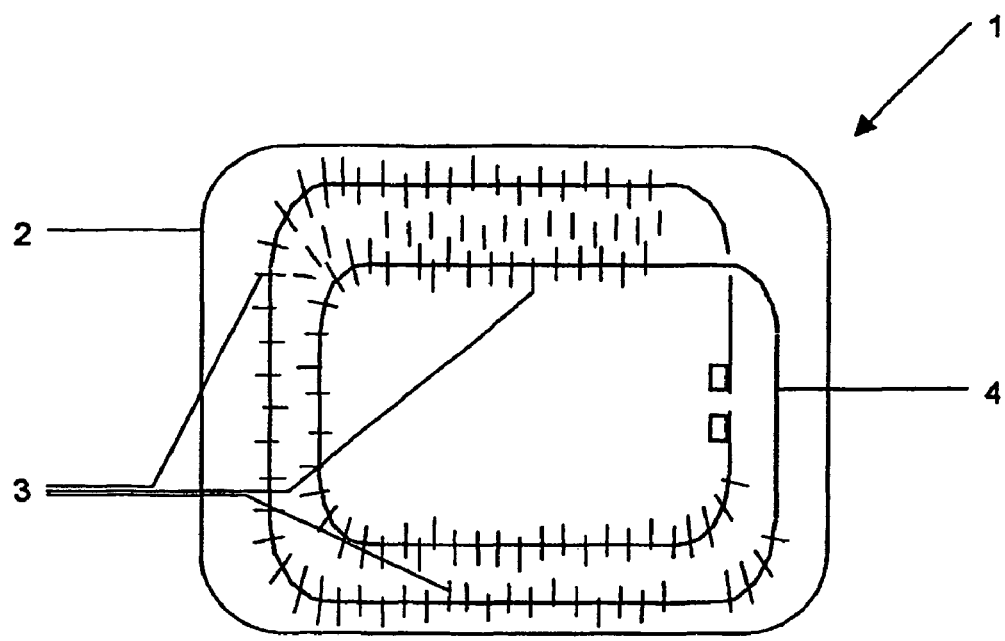
FIG. 1 a unit for shielding a transponder according to a first aspect of the present invention.

FIG. 1 shows a unit 1 for shielding a transponder, which comprises at least a chip and an antenna structure 4 with application-specific spatial dimensions and which is secured to an electrically conductive surface, according to a first aspect of the present invention. The antenna structure 4 shown in FIG. 1 represents a conductor loop and an antenna coil, respectively.

The unit 1 comprises a substrate 2 having formed thereon a plurality of fixed ferromagnetic particles 3 in an area having at least the spatial dimensions of the antenna structure 4 of the transponder.

The antenna structure 4 of the transponder is shown in FIG. 1 only for clearly indicating this area on the substrate 2, said antenna structure 4 being, however, not visible when the shielding itself is being produced in cases in which the transponder is not formed on the substrate 2.

The respective ferromagnetic particles 3 are oriented such that, when the substrate 2 has been secured to the transponder, they will be oriented parallel to a magnetic field induced in the antenna structure 4 of the transponder, so as to suppress eddy currents which are generated by the electrically conductive surface in the antenna structure 4, when the transponder is being introduced in a magnetic field of a respective reading device.

The substrate 2 is preferably provided with ferromagnetic particles 3 on the front and on the back and can be made of an electrically non-conductive material, e.g., an organic polymer. In particular, the substrate 2 can be made of paper. Furthermore, the substrate 2 can represent a transponder or an inlay for a transponder. The advantage of applying the ferromagnetic material to the front and to the back is to be seen in the fact that a closed surface is obtained (in a projection at right angles to the main surface) and that eddy current losses will in this way be suppressed completely.

The ferromagnetic particles 3 are made, e.g., of iron or of an alloy producing a similar effect or they preferably belong to the garnet group of substances (yttrium-aluminum compounds) for higher frequencies.

Figure 2:
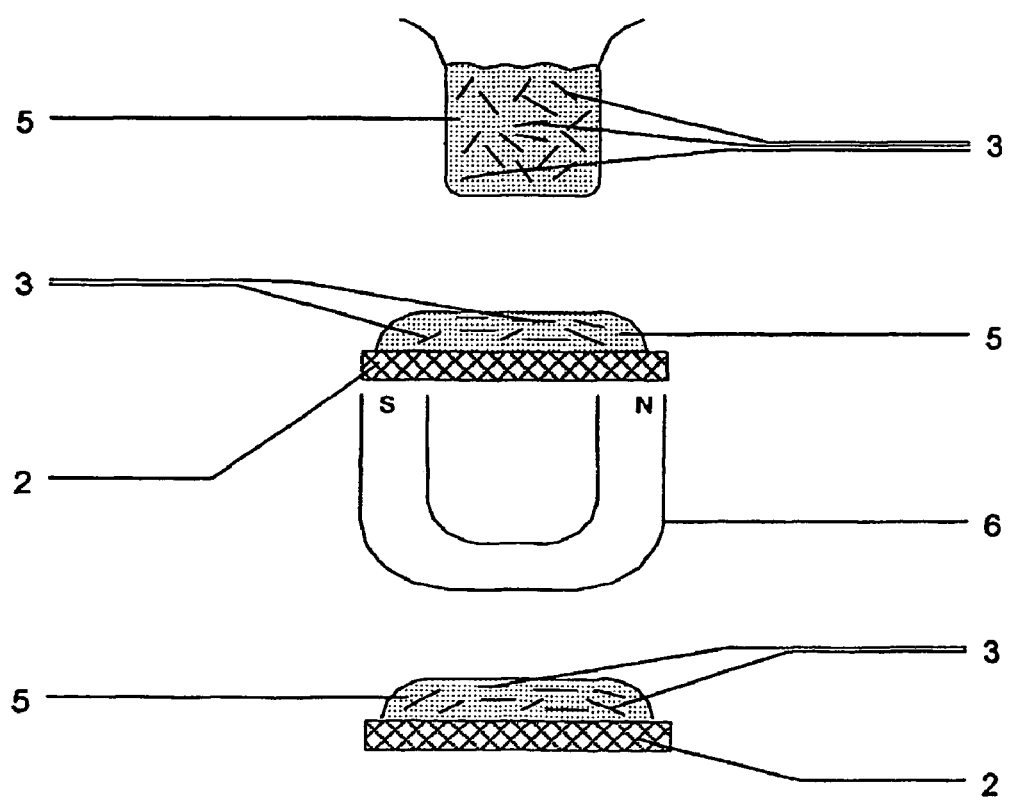
FIG. 2 a schematic view of the steps to be executed in a method of producing a shielding for a transponder according to the first aspect of the present invention.

FIG. 2 shows a schematic view of the steps to be executed in a method of producing a shielding for a transponder which comprises at least a chip and an antenna structure with application-specific spatial dimensions, the shielding being formed on the substrate, according to a first aspect of the present invention.

In a first step, ferromagnetic particles 3 are applied to a substrate area having at least the spatial dimensions of the antenna structure of the transponder. The particles are preferably applied by means of a lacquer 5 having a suitable viscosity and containing suspended ferromagnetic particles 3.

The ferromagnetic particles 3 are made of, e.g., a soft-magnetic iron or of a ferroelectric material producing a similar effect or of an alloy or mixture producing an effect of the type in question. The respective ferromagnetic particles 3 preferably have longitudinal dimensions which are comparable with the width of the induced magnetic field, e.g., 1/20 to 1/5 of the width of the induced magnetic field. Preferably, the ferromagnetic particles 3 are highly permeable and implemented as elongate particles, each having a length of approx. 50 to 500, preferably 300 µm, a width of 10 to 60 µm and a thickness of 10 to 60 µm.

In a further step, the ferromagnetic particles 3 are oriented by means of a constant magnetic field in such a way that, when the substrate 2 has been secured to the transponder, the particles 3 will be oriented parallel to a magnetic field induced in the antenna structure of the transponder. The ferromagnetic particles are oriented, e.g., by means of one or a plurality of permanent magnets 6 or by means of one or a plurality of electrically excited magnets with a constant magnetic field. In particular, the particles 3 are oriented in accordance with the geometry of the antenna structure by the constant magnetic field in such a way that the particles will be oriented according to the energy-minimizing principle in the direction of field.

The orienting can also be executed when the substrate 2 has been attached to the transponder. In addition, the lacquer 5 for producing the shielding for the transponder can be applied directly to the transponder so that the formation of an additional substrate 2 as a support for the shielding can be dispensed with.

In a further step, the oriented particles 3 are fixed to the substrate 2. The fixing of the oriented particles 3 can be accomplished by means of an adhesive, the ferromagnetic particles 3 being preferably applied together with the adhesive and the fixing taking place during or immediately after the orienting of the ferromagnetic particles 3.

In the event that the ferromagnetic particles 3 are contained in a lacquer 5 which has been applied to the substrate 2, the fixing of the oriented particles 3 is preferably accomplished by means of thermal drying and hardening of the lacquer.

The ferromagnetic particles 3 can also be applied in that they are scattered on the substrate, then oriented and finally fixed.

Another possibility is to combine the steps of applying and orienting in that the ferromagnetic particles are already punched out in the correct orientation and in that this punched pattern is then applied unchanged to the substrate.

Finally, it is also possible to generate oriented patterns of ferromagnetic particles by means of etching techniques, making use of, e.g., photolithographic methods.

The shielding layer produced in this way can then be incorporated in the transponder structure. The magnetic shielding layer can perhaps be placed directly on metal, in the event that the magnetic conductor is essentially electrically insulating. Otherwise, attention should be paid to the fact that the shielding layer has to be applied to an electric insulating layer. According to a preferred embodiment, the shielding layer is laminated in, when the transponder is being produced.

According to a specially preferred aspect of the present invention, a shielding or shielding layer is produced on the front and on the back of the same thin substrate 2. The application of the ferromagnetic particles 3 is then executed sequentially, i.e., in a first step on the front and in a second step on the back. In particular, the shielding layer applied in the second step is additionally oriented according to the already existing first oriented shielding layer and is preferably oriented such that gaps existing in the first layer will be covered. This can be supported, e.g., by a slightly oblique position of the orienting constant magnetic field.

Figure 3:
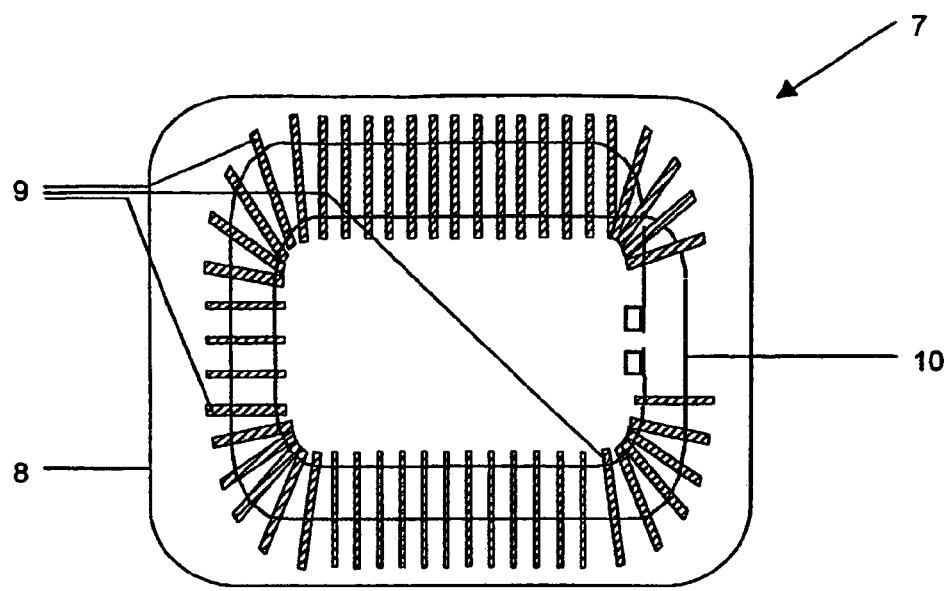
FIG. 3 a unit for shielding a transponder according to a second aspect of the present invention.

FIG. 3 shows a unit 7 for shielding a transponder, which comprises at least a chip and an antenna structure 10 with application-specific spatial dimensions and which is attached to an electrically conductive surface, according to a second aspect of the present invention. The antenna structure 10 shown in FIG. 2 represents a conductor loop and an antenna coil, respectively.

The unit 7 comprises a film 8 having formed thereon or therein a highly permeable material in an area having the spatial dimensions of the antenna structure 10 of the transponder.

The antenna structure 10 of the transponder is shown in FIG. 1 only for clearly indicating this area on the film 8, said antenna structure 10 being, however, not visible when the shielding itself is being produced in cases in which the transponder is not formed on the film 8.

The highly permeable material is subdivided into elongate shielding elements 9 and free spaces arranged between the respective shielding elements 9, in such a way that, when the substrate has been secured to the transponder, the shielding elements 9 are oriented parallel to a magnetic field induced in the antenna structure 10 of the transponder, so as to suppress eddy currents which are generated by the electrically conductive surface in the antenna structure 10, when the transponder is being introduced in a magnetic field of a respective reading device.

Figure 4:
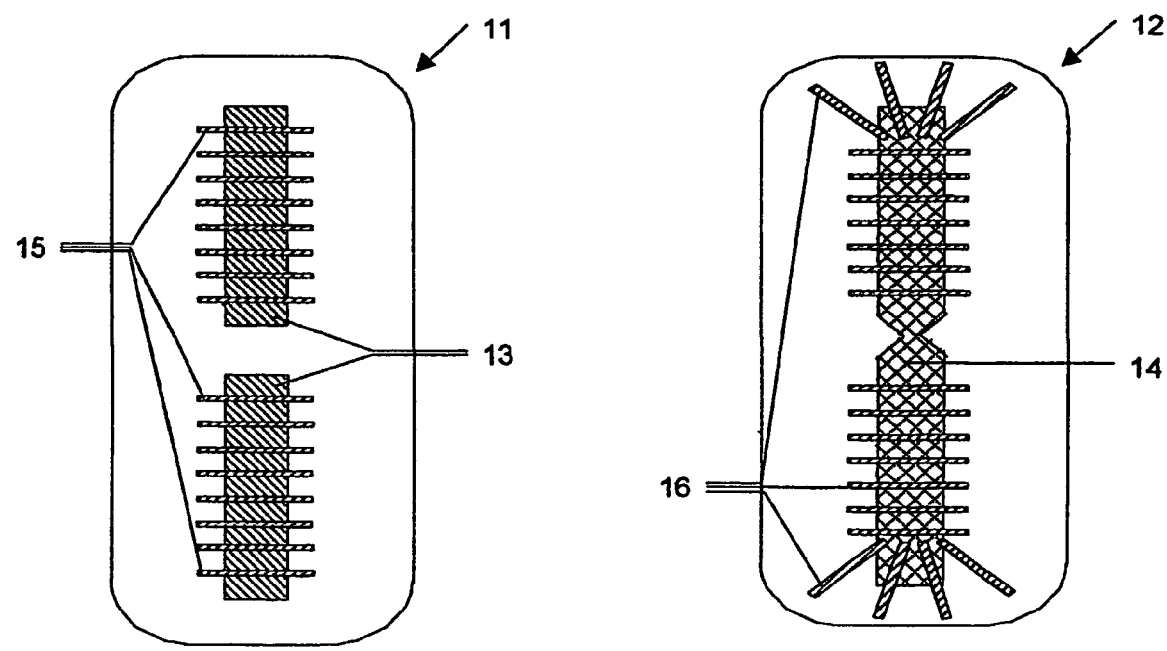
FIG. 4 a unit for shielding a transponder according to a third aspect of the present invention.

FIG. 4 shows units 11, 12 for shielding a transponder, which comprises at least a chip and an antenna structure 13, 14 with application-specific spatial dimensions and which is secured to an electrically conductive surface, according to a third aspect of the present invention.

The antenna structure 13, 14 represents a dipole antenna, which is here shown as an open dipole. For reasons of impedance and interference immunity, a so-called slot antenna may, however, be used as well, i.e., a closed or open dipole are alternatively used, which form, e.g., a so-called slot antenna.

Since the direction of a field to be shielded against is also known in this case and predetermined by the dipole antenna 13, 14, respective ferromagnetic particles or shielding elements 15, 16 can here once more be oriented in a suitable manner, i.e., at right angles to the orientation of the dipole and at right angles to the direction of arrival.

For reasons of characteristic impedance adaptation and antenna gain, slot antennas 14 are preferably used in the GHz region. Also these antennas can be shielded with regard to their magnetic field components. Geometrically, the pattern of the structured shielding is here similar to a large-area, open dipole.

The materials used for shielding in the upper MHz and GHz regions are preferably the substances known from the field of military "stealth technology", which are based on aluminum-iron garnets and analogous alloys.

While the invention has been described with respect to the physical embodiments constructed in accordance therewith, it will be apparent to those skilled in the art that various modifications, variations and improvements of the present invention may be made in the light of the above teachings and within in the purview of the appended claims without departing from the spirit and intended scope of the invention. In addition, those areas in which it is believed that those of ordinary skill in the art of familiar have not been described herein in order not to unnecessarily obscure the invention described herein. Accordingly, it is to be understood that the invention is not to be limited by the specific illustrative embodiments, but only by the scope of the appended claims.

The invention claimed is:

1. A method of producing a shielding for a transponder, which comprises at least a chip and an antenna structure with application-specific spatial dimensions, the shielding being formed on a substrate, said method comprising:
   applying ferromagnetic particles to an area of the substrate having at least the spatial dimensions of the antenna structure of the transponder;
   orienting the ferromagnetic particles by a constant magnetic field in such a way that, when the substrate has been attached to the transponder, the particles will be oriented parallel to a magnetic field induced in the antenna structure of the transponder; and
   fixing the oriented particles.

2. The method according to claim 1, wherein the ferromagnetic particles are oriented by one or a plurality of permanent magnets.

3. The method according to claim 1, wherein the ferromagnetic particles are oriented by one or a plurality of electrically excited magnets with a constant magnetic field.

4. The method according to claim 1, wherein the oriented particles are fixed by an adhesive.

5. The method according to claim 4, wherein the ferromagnetic particles are applied together with the adhesive and the fixing takes place during or immediately after the orienting of the ferromagnetic particles.

6. The method according to claim 1, wherein the ferromagnetic particles are contained in a lacquer which is applied to the substrate.

7. The method according to claim 6, wherein the oriented particles are fixed by thermal drying and hardening of the lacquer.

8. The method according to claim 1, wherein the ferromagnetic particles are highly permeable and elongate in shape.

9. The method according to claim 8, wherein the ferromagnetic particles each have a length of about 300μm, a width of about 50μm, and a thickness of about 10μm.

10. The method according to claim 1, wherein the ferromagnetic particles are made of soft-magnetic iron or of a ferroelectric material producing a similar effect or of an alloy or mixture producing an effect of the type in question.

11. The method according to claim 1, wherein the respective ferromagnetic particles have a longitudinal dimension which is comparable with the width of the induced magnetic field.

12. The method according to claim 11, wherein the said longitudinal dimension of the ferromagnetic particles amounts to 1/20 to 1/5 of the width of the induced magnetic field.

13. The method according to claim 1, wherein the substrate is applied to the transponder after the fixing of the ferromagnetic particles.

14. The method according to claim 1, wherein the transponder is formed prior to producing the shielding on the substrate.

15. The method according to claim 1, wherein the ferromagnetic particles are applied by a printing technique.

16. The method according to claim 1, wherein the shielding layer and the antenna are combined by folding or laminating.

17. A unit for shielding a transponder, which comprises at least a chip and an antenna structure with application-specific spatial dimensions and which is attached to an electrically conductive surface, said unit comprising:
a substrate having formed thereon a plurality of fixed ferromagnetic particles in an area having at least the spatial dimensions of the antenna structure of the transponder; wherein
the respective ferromagnetic particles are oriented such that when the substrate has been attached to the transponder, the ferromagnetic particles will be oriented parallel to a magnetic field induced in the antenna structure of the transponder so as to suppress eddy currents which are generated by the electrically conductive surface in the antenna structure when the transponder is being introduced in a magnetic field of a respective reading device.

18. The unit according to claim 17, wherein the substrate is provided with ferromagnetic particles on the front and on the back.

19. The unit according to claim 17, wherein a plurality of ferromagnetic layers are provided one on top of the other, said layers being, however, separated by insulators.

20. The unit according to claim 17, wherein the substrate is made of an electrically non-conductive material.

21. The unit according to claim 20, wherein the substrate is made of an organic polymer.

22. The unit according to claim 21, wherein the substrate represents a transponder or an inlay for a transponder.

23. The unit according to claim 17, wherein the substrate is made of paper.

24. The unit according to claim 17, wherein the antenna structure represents an antenna coil.

25. The unit according to claim 17, wherein the antenna structure represents a closed or an open dipole.

26. The unit according to claim 25, wherein the antenna structure represents a slot antenna.

27. The unit according to claim 17, wherein the ferromagnetic particles are made of iron.

28. The unit according to claim 17, wherein the ferromagnetic particles belong to the garnet group of substances (yttrium-aluminium compounds).

29. A transponder which comprises at least a chip and an antenna structure and which is attached to an electrically conductive surface, wherein at least one unit according to claim 17 is provided between the transponder and the electrically conductive surface.

30. A unit for shielding a transponder, which comprises at least a chip and an antenna structure with application-specific spatial dimensions and which is attached to an electrically conductive surface, said unit comprising:
a film having formed thereon or therein a highly permeable material at least in an area having the spatial dimensions of the antenna structure of the transponder; wherein
the highly permeable material is subdivided into elongate shielding elements and free spaces arranged between the respective shielding elements such that when the substrate has been attached to the transponder, the shielding elements will be oriented parallel to a magnetic field induced in the antenna structure of the transponder so as to suppress eddy currents which are generated by the electrically conductive surface in the antenna structure when the transponder is being introduced in a magnetic field of a respective reading device.

* * * * *